Oct. 9, 1934.　　　C. W. BRISTOL　　　1,976,477
RANGE ADJUSTING MECHANISM FOR MEASURING INSTRUMENTS
Filed May 5, 1931
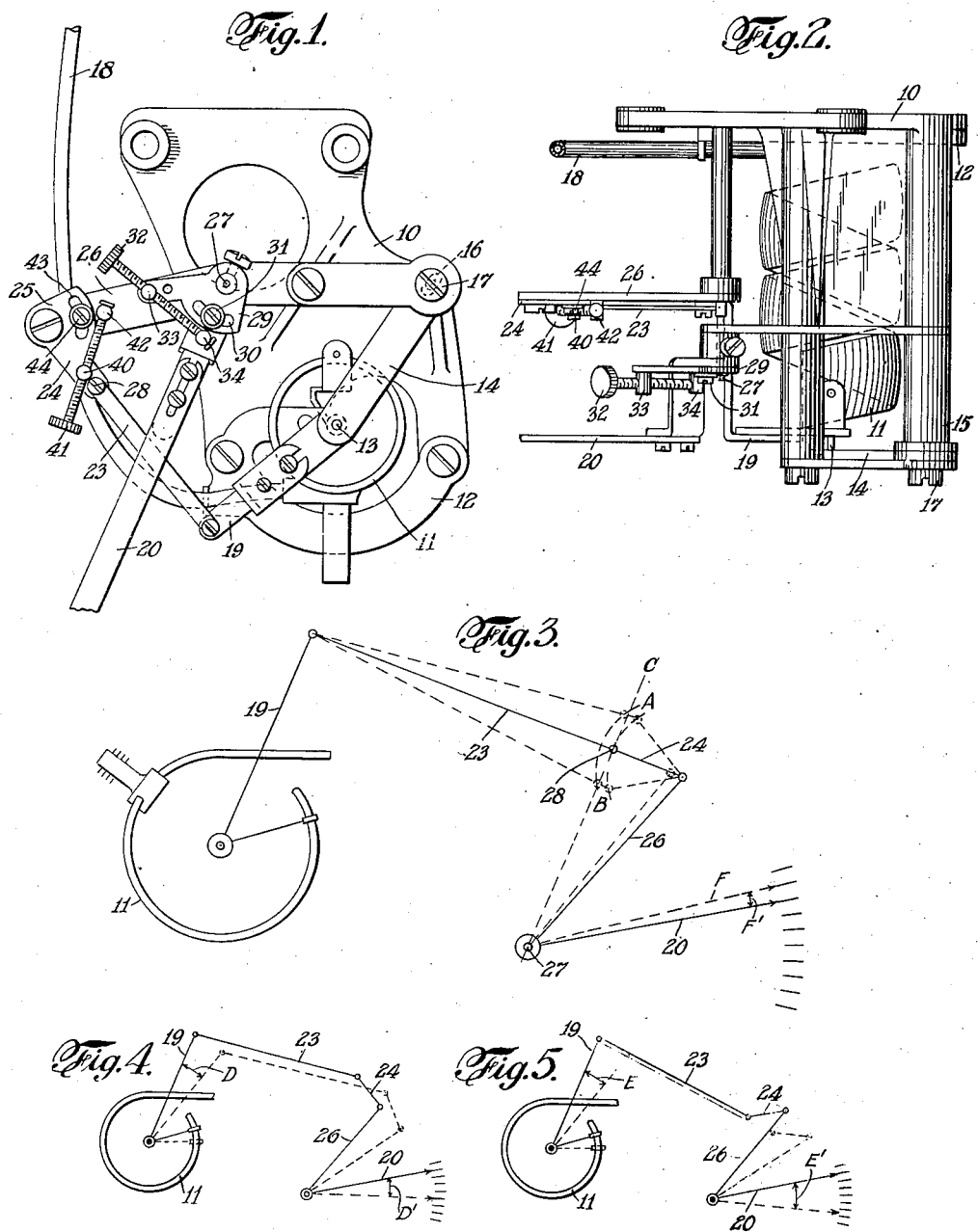
INVENTOR
CARLTON W. BRISTOL
BY
ATTORNEY Patented Oct. 9, 1934

1,976,477

UNITED STATES PATENT OFFICE 1,976,477

RANGE ADJUSTING MECHANISM FOR MEASURING INSTRUMENTS

Carlton W. Bristol, Naugatuck, Conn., assignor to The Bristol Company, Waterbury, Conn., a corporation of Connecticut Application May 5, 1931, Serial No. 535,152

8 Claims. (Cl. 73—109)

The invention relates to measuring instruments, and more particularly to means for effecting a limited adjustment of the range of the effective throw of the multiplying mechanism included between the responsive member of the instrument and its movable pointer or index element.

The invention has for its object the provision of means included in the multiplying mechanism whereby it is possible to make certain adjustments intermediate a responsive member and its index element and change thereby the effective movement of said pointer or index element to different readings for the same increment of movement of the responsive member. A further object is to effect this change in a simple and precise manner and whereby a minimum displacement of the pointer element from its zero or normal position will result.

In carrying out the invention, multiplying mechanism including a link between the responsive member and the pointer arbor is provided, and there is interposed a bell crank having a pivoted connection with the one end of the link. Means, also, are associated with the bell crank whereby the ratio between the length of the responsive member actuating link connection and the effective length of the pointer arbor link connection may be altered in shifting the said pivotal connection so as to adjust the deflection of the pointer element to the desired extent for a unit increment of movement of the responsive element.

The nature of the invention, however, will best be understood when described in connection with the accompanying drawing, in which:

Fig. 1 is a front elevation of a responsive element and pointer element, with intermediate multiplying mechanism embodying the novel adjustment device.

Fig. 2 is a plan thereof.

Fig. 3 is a kinematic diagram illustrating the adjustment feature of the novel mechanism.

Figs. 4 and 5 are further kinematic diagrams illustrating the effect of the adjustments on the action of the multiplying mechanism.

Referring to the drawing, 10 designates a suitable base plate upon which is mounted the responsive element unit embodying a helically coiled flattened tubular member 11 constituting a so-called "Bourdon" tube secured at one end rigidly to a plate 12 designed to be attached to the base plate 10. The free end is provided with a fixed pivot 13 journaled in a bracket arm 14 which in turn is rigidly secured to a post 15 extending upwardly from the base 10. It is preferred to longitudinally slot the inner end of arm 14, as indicated at 16, to more readily accommodate the location of the pivot in allowing a slight radial adjustment of said arm over the post and to which it is then rigidly secured by means of a screw 17. An expansible fluid is designed to be introduced to the pressure element or tube 11—from a source (not shown) and whose variations it is designed to measure—through a flexible tubular connection 18, the responsive element contracting and expanding in accordance with the changes in fluid pressure applied thereto as is well understood, and oscillating accordingly an arm 19 attached thereto.

The present invention relates more especially to the transmission of movement of element 11 to a pointer or index element 20, and in such a manner that an adjustment is possible therein whereby the deflection of said pointer may be altered per unit increment of movement of the said responsive element.

To this end, arm 19 of the responsive member is pivotally connected to a link 23 which at its opposite end is pivoted to the one arm 24 of a bell crank having the other arm 25. Arm 25 is pivoted to the outer end of an arm 26 extending from the arbor 27 for the pointer element 20 to oscillate the same in accordance with the movement imparted thereto through the hereinbefore described multiplying mechanism. The link connection between the two arms 19 and 26 while normally direct may nevertheless be displaced at the pivotal point 28 where it joins the bell crank arm 24.

The pointer element 20, however, is not directly attached to the arbor 27 but is carried in part by the one arm of a plate 29 which is rigidly secured to said arbor 27. The said arm of the plate is provided with an arcuate slot 30 through which passes a locking screw 31 designed to secure rigidly the pointer element to the plate so that any movement communicated thereto through the arbor will be reproduced as a corresponding deflection of the pointer element. A finely threaded screw 32, suitable for adjustments of the order of 1/1000 of an inch, is also designed to support the pointer element in passing through the suitably tapped and swivelled stud or post 33 which extends upwardly from the plate 29 and at its free end engages a swivelled head 34 attached to the inner end of said pointer element 20.

By rotating suitably the screw 32, the said pointer element may be adjusted angularly on the plate 29, screw 31 having first been loosened in making an adjustment say, for example, of the zero position of the pointer element. This position may have become displaced during shipment of an instrument, or adjustments may become necessary from time to time during the life of the instrument by reason of wear of parts and because of the aging or gradual change in sensitiveness of the Bourdon tube to applied pressures.

No claim is made to this particular adjustment, however, and the same becomes necessary also to a limited extent when a change in calibration is made by the novel mechanism hereinafter set forth, although it is to be noted that the particular calibration-changing mechanism results in but a minimum disturbance of the normal pointer position.

To effect the desired change in calibration, an adjustment device similar to that previously described in connection with the zero-setting position is utilized, more particularly in connection with the bell crank 24—25. For example, a tapped and swivelled stud or post 40 extends upwardly from the bell crank arm 24 with finely threaded screw 41 passing therethrough and having a swivelled connection at its outer end with the head 42 attached to the arm 26.

Similarly, the bell crank arm 25 is provided with an arcuate slot 43 and locking screw 44 passing therethrough and into said arm 26. When this latter screw is loosened, screw 41 may be rotated to shift the pivotal point 28, at which link 23 is connected with bell crank arm 24, either to the one side to the position (A), Fig. 3, or oppositely to the position (B). A variation thereby results in the ratio between the length of arm 19 and the effective length of arm 26 which is represented substantially by the distance along the radius (C) between the arbor 27 and the pivotal point 28.

This will result in a smaller or larger deflection per increment of movement of the responsive element 11 (whose response remains constant), as transmitted through the hereinbefore described multiplying mechanism, and the adjustment is made to suit the desired scale. In other words, the effective length of arm 26 with reference to arm 19 is changed by moving the pivotal connection 28 between link 23 and bell crank arm 24 more or less radially away and toward the arbor 27 of the pointer element.

For example, reference being had to Figs. 4 and 5, an angular movement (D) of the arm 19 will be reproduced by the pointer element 20 over the arc (D') for an adjustment to position (A). By shortening the effective length of arm 26 in adjusting pivotal point 28 to the position (B), the throw of the pointer for an equal angular movement (E) will be through an angle (E') which is considerably greater than the angle (D').

Moreover, the arc of adjustment comprehended between the limiting positions (A) and (B) is tangential at the normal midposition of pivotal point 28 to the radius (C) and the pivotal points of the arms 19 and 26 to the link then lie in the same line with said pivotal point 28. This arc is maintained substantially tangential to avoid as far as possible displacement of the zero position of the pointer 20 which necessitates correction by means of the screw 32, as hereinbefore described.

Any disturbance in the absolute or zero position of the pointer element 20 resulting from the aforesaid change in calibration, as indicated by the dotted line position (F), Fig. 3, is readily accommodated and corrected by means of the said adjusting screw 32, the maximum displacement of the normal zero position being indicated by the arc (F'), Fig. 3.

I claim:

1. In a system embodying two angularly movable arms and a connecting link: means for effecting an adjustment of the ratio of the respective angular movements of the said arms, comprising an element movable about a fixed point of one of the arms and pivotally connected to one end of the link, and an adjusting screw pivotally mounted on the said movable element and swivelled on the arm to which said element is pivoted.

2. In a system embodying two angularly movable arms and a connecting link: means for effecting an adjustment of the ratio of the respective angular movements of the said arms, comprising a bell crank pivoted to one of the arms and pivotally connected to one end of the link, and an adjusting screw pivotally mounted on the bell crank and swivelled on the bell crank carrying arm.

3. In a measuring instrument embodying an expansible responsive element and an index element adapted to be actuated thereby: multiplying mechanism included between the same and comprising an arm of fixed length movable by said responsive element, an arm of fixed length connected with the index element for moving the same, a link having pivotal points permanently connected to said arms, one of said connections including means connected with the link and supported by one of the arms for changing the effective length of the latter.

4. In a measuring instrument embodying an expansible responsive element and an index element adapted to be actuated thereby: multiplying mechanism included between the same and comprising an arm of fixed length movable by said responsive element, an arm of fixed length connected with the index element for moving the same and including a pivoted portion, a link having pivotal points permanently connected to said arms, one of said connections including means connected with one end of the link and the index element arm for moving said end of the link at its junction with the said pivoted portion of the arm substantially along a line at right angles to the said link.

5. In a measuring instrument embodying an expansible responsive element and an index element adapted to be actuated thereby: multiplying mechanism included between the same and comprising an arm of fixed length movable by said responsive element, an arm of fixed length connected with the index element for moving the same, a link having pivotal points permanently connected to said arms, one of said connections including means connected with the link and supported by one of the arms to adjust one end of the link about a center located along the length of said arm for changing its effective length.

6. In a measuring instrument embodying an expansible responsive element and an index element adapted to be actuated thereby: multiplying mechanism included between the same and comprising an arm of fixed length movable by said responsive element, an arm of fixed length connected with the index element for moving the same, a link having pivotal points permanently connected to said arms, an intermediate bell crank pivotally mounted on the index arm and having a pivotal connection to one end of the link, and an adjusting member carried by the said bell crank and connected with the index arm for shifting its said pivotal connection with the link relatively to the index element arm.

7. In a measuring instrument embodying an expansible responsive element and an index element adapted to be actuated thereby: multiplying mechanism included between the same and comprising an arm of fixed length movable by said responsive element, an arm of fixed length connected with the index element for moving the same, a link having pivotal points permanently connected to said arms, an intermediate bell crank pivotally mounted on the index arm and having a pivotal connection to one end of the link, and an adjusting member carried by the said bell crank and connected with the index element arm for shifting its said pivotal connection with the link relatively to the index element arm in a direction substantially along a radius from the rotational axis of the index element arm to the said pivotal connection of the bell crank with the link.

8. In a measuring instrument embodying an expansible responsive element and an index element adapted to be actuated thereby: multiplying mechanism included between the same and comprising an arm of fixed length movable by said responsive element, an arm of fixed length connected with the index element for moving the same, a link having pivotal points permanently connected to said arms, an intermediate bell crank pivotally mounted on the index arm and having a pivotal connection to one end of the link, and an adjusting member carried by the said bell crank and connected with the index element arm for shifting its said pivotal connection with the link relatively to the index element arm in a direction substantially along a radius from the rotational axis of the index element arm to the said pivotal connection of the bell crank with the link and in an arc about the pivotal point of connection of the said bell crank to the index element arm.

CARLTON W. BRISTOL.